W. SERVISS.
Gate.
No. 69,494.
Patented Oct. 1, 1867.
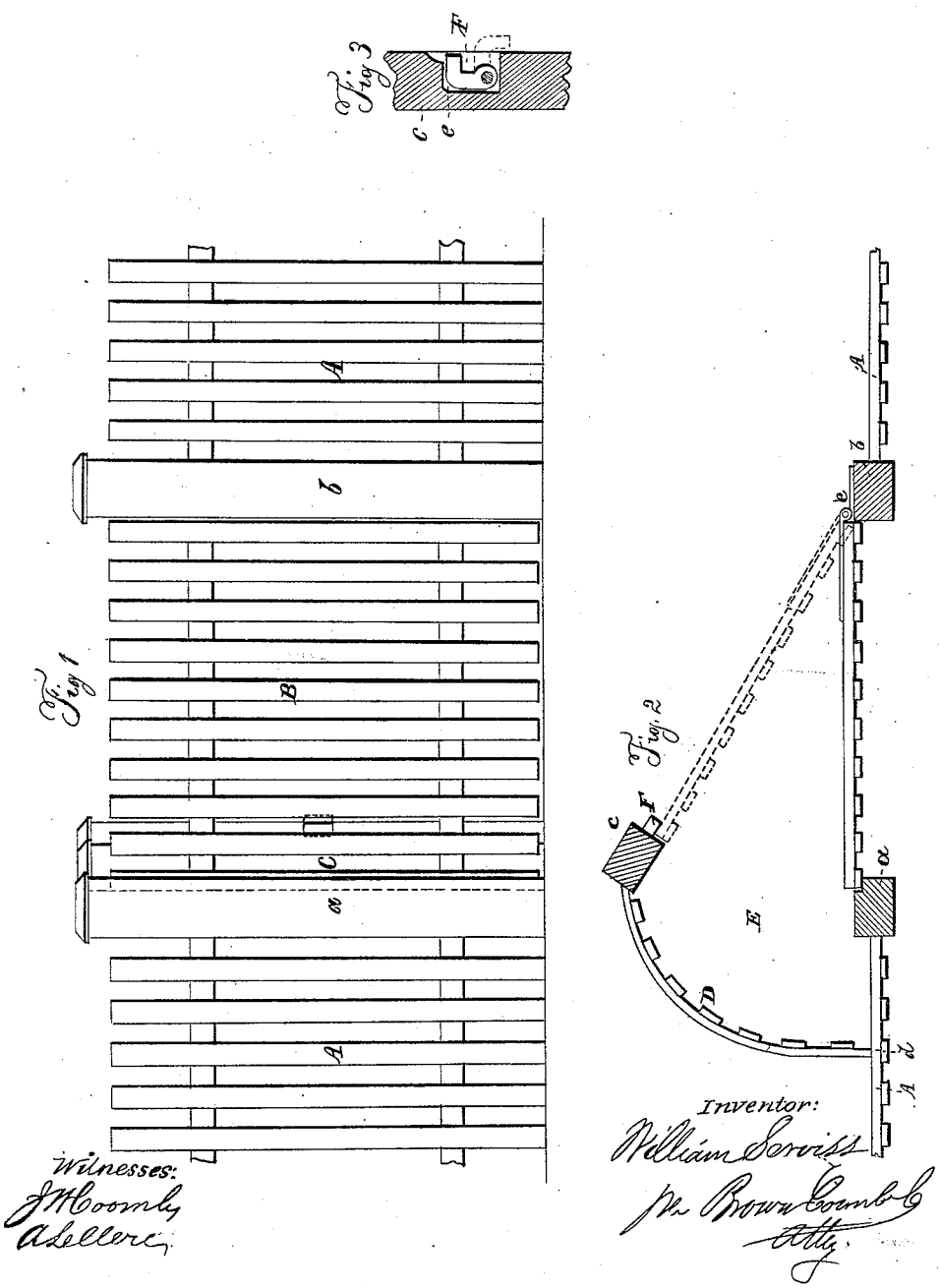
Witnesses:
J H Coombs
A Leller
Inventor:
William Serviss

United States Patent Office.

WILLIAM SERVISS, OF SIDNEY, OHIO.

Letters Patent No. 69,494, dated October 1, 1867.

---

IMPROVEMENT IN GATES.

---

*The Schedule referred to in these Letters Patent and making part of the same.*

---

TO ALL WHOM IT MAY CONCERN:

Be it known that I, WILLIAM SERVISS, of Sidney, in the county of Shelby, and State of Ohio, have invented certain new and useful improvements in Gates; and I do hereby declare that the following is a full, clear, and exact description of the same, reference being had to the accompanying drawings, making a portion of this specification, in which—

Figure 1 is a front view of a gate constructed according to my invention.

Figure 2 is a plan view of the same.

Figure 3 is a detached section of a portion of the same.

Similar letters of reference indicate corresponding parts in both figures.

The object of this invention is to secure a gate which, as ordinarily used, will permit the free passage through it of foot-passengers, but prevent that of horses and cattle; and it consists in a hinged gate, so combined with a partially-enclosed space, or partial enclosure adjacent thereto, that when the gate is in one position a person may pass into the aforesaid enclosure from one side of the gate, and when the same is in another position may pass out from the enclosure upon the opposite side of such gate, thus effectually securing the desired object. The invention further consists in a latch or stop, in combination with the gate and the panel around the aforesaid partial enclosure, whereby the gate may when desired be swung completely open, after the manner of an ordinary gate, to permit horses, cattle, or other like animals, to pass through the same.

To enable others to understand the nature and construction of my invention I will proceed to describe it with reference to the drawings.

A represents the fence through which the gate is designed to afford a passage, and in line with which are the two gate-posts $a$ and $b$, to one, $b$, of which the gate B is hinged by suitable hinges, as shown more fully at $c$, in fig. 2. C represents a post situated at a little distance from the post $a$, and which is so placed that when the gate is swung into the position shown in red outline in fig. 2 the free or outer end thereof will be brought close to the post C, as shown by the aforesaid red outline, in fig. 2. Extending from a point, $d$, of the fence A, at a little distance from the post $a$, to the post C, is a curved panel, D, which partially encloses a space or enclosure, E, which is thus left open only at one side, as shown in the figure just mentioned. Formed in one side of the post C is a recess, $e$, in which is pivoted a stud or latch, F, as represented more plainly in fig. 3, in such manner that the said latch may be turned upward, wholly within the recess $e$, into the position shown in the said fig. 3, or be turned downward so as to project out at right angles to the post C, as shown in the dotted outline in such figure, and also in fig. 2, the latch in this position serving as a stop to prevent the gate from being swung outward past the post C. The gate being, for instance, in the position shown in fig. 2, or, in other words, in line with the fence A, a person in passing through the same from the front side thereof will first push the gate into the position shown in red outline, (the movement of the gate being limited by the latch F, as hereinbefore set forth,) and then step into the space enclosed by the panel D and the adjacent portion of the frame A, whereupon the gate is swung back to its first position, past such person, who then passes out from the said space at the opposite side of the gate. In passing through from the rear or opposite side the person would of course first enter the space or enclosure just mentioned, and, swinging the gate back against the latch F, pass out of such space at the front of the gate, so that by this means a person or foot-passenger may easily pass from one side of the fence to the other; at the same time that, inasmuch as the space or enclosure described is not large enough to permit an ox, horse, or other like animal to enter the same, it follows that the passage of such animal is effectually prevented. In case it should be desired, for any reason, to permit the passage of such animals the latch F is turned upward, within the recess $e$, as hereinbefore set forth, and the gate, being swung past the post C, is brought into a position beside and parallel with the fence A, thus entirely enclosing the gateway between the posts $a\ b$.

What I claim as my invention, and desire to secure by Letters Patent, is—

The arrangement of the post C of the partial enclosure, relatively to the posts $a\ b$, when provided with a hinged stop F, whereby the gate is retained between the points C $a$ of the enclosure, or may be opened at pleasure, substantially as set forth.

WILLIAM SERVISS.

Witnesses:
JAMES McCULLOUGH,
SAMUEL MATHERS.